(12) United States Patent
Hardy et al.

(10) Patent No.: US 6,439,635 B1
(45) Date of Patent: Aug. 27, 2002

(54) HYDRAULIC SEAT LIFT FOR ALL-TERRAIN VEHICLES

(76) Inventors: Robert B Hardy, P.O. Box 786, East Ellijay, GA (US) 30539; David G Patterson, 6139 River Rd., Ft. Valley, GA (US) 31030; Richard Smith, 6139 River Rd., Ft. Valley, GA (US) 31030

( * ) Notice: Subject to any disclaimer, the term of this patent is extended or adjusted under 35 U.S.C. 154(b) by 0 days.

(21) Appl. No.: 09/713,791

(22) Filed: Nov. 16, 2000

(51) Int. Cl.[7] ............................ B60N 2/02; A01M 31/02
(52) U.S. Cl. ............................ 296/65.01; 297/216.15; 182/69.6; 43/1
(58) Field of Search ............................ 296/65.01, 69; 43/1; 182/63.1, 69.5, 69.6; 297/216.15, 216.16, 216.17

(56) References Cited

U.S. PATENT DOCUMENTS

| | | | | |
|---|---|---|---|---|
| 4,625,831 A | * | 12/1986 | Rodgers, Jr. | |
| 4,696,374 A | * | 9/1987 | Hale | |
| 4,800,986 A | * | 1/1989 | Hayes, III | |
| 4,822,094 A | * | 4/1989 | Oldfather et al. | |
| 5,005,894 A | * | 4/1991 | Nagata | 296/68.1 |
| 5,042,614 A | * | 8/1991 | Rainey | |
| 5,176,355 A | * | 1/1993 | Carter | |
| 5,222,709 A | * | 6/1993 | Culley, Jr. et al. | |
| 5,297,844 A | * | 3/1994 | Haustein | |
| 6,105,721 A | * | 8/2000 | Haynes | 182/127 |
| 6,193,297 B1 | * | 2/2001 | Vandermolen | 296/65.01 X |

* cited by examiner

*Primary Examiner*—Joseph D. Pape
(74) *Attorney, Agent, or Firm*—Michael I. Kroll

(57) ABSTRACT

The present invention 10 discloses a hydraulic seat lift 20 for an all-terrain vehicle 26 having the driver's seat 16 located on a top portion of a platform 20 and the superior end of the hydraulic scissor-lift mechanism 44 fastened to a side portion of the platform 20 in a manner that would raise the driver seated on the platform as the hydraulic scissor-lift mechanism 44 is extended and would lower the operator as it retracts. The hydraulic scissor-lift mechanism comprises two hydraulically powered scissor-lifts 44 located on opposing sides of the seat lift platform 20 with each scissor-lift comprising inversely paired diagonal cross-members that are medially connected to one another with the distal ends of each pair of cross-members pivotably connected to the distal ends of the next pair of cross-members which can be repeated to form a vertically stacked series of interconnected cross-members. Each end of a scissor-lift 44 has the distal end of one cross-member attached to a stationary scissor pin 52 to remain in a fixed position while its opposite cross-member slides within an elongated recess 68 on a scissor roller 64 when an attached hydraulic lift bar 62 is driven by a hydraulic piston 60 to increase or decrease the distance between the two ends thereby extending or retracting the scissor-lift 44 accordingly.

19 Claims, 14 Drawing Sheets

HYDRAULIC SEAT LIFT FOR ALL-TERRAIN VEHICLES

BACKGROUND OF THE INVENTION

1. Field of the Invention

The present invention relates generally to elevating platforms for vehicles and, more specifically, to an all-terrain vehicle having a seat secured to a platform that can be hydraulically raised to a level substantially above the vehicle by controls accessible to the person in the seat. The present invention includes outriggers that must be deployed prior to raising the seat platform in order to stabilize the vehicle and offset the increasing center of gravity as the platform is raised. The present invention could be particularly helpful to hunters who could drive to the location of their preference and raise the seat platform to an appropriate perch to provide a superior line of sight for detecting prey while also making it difficult for approaching prey to pick up the scent of the hunter. In the event that prey is shot and wounded the hunter needs only to lower the seat platform and raise the outriggers to give chase on his ATV allowing the prey to get a minimal lead. The comfort level of the hunter in the ATV is vastly improved over sitting in a tree or using the tree seats that are commonly used by hunters.

2. Description of the Prior Art

There are numerous elevating platforms for vehicles. While these elevating platforms for vehicles may be suitable for the purposes for which they were designed, they would not be as suitable for the purposes of the present invention as heretofore described. It is thus desirable to provide an all-terrain vehicle having the operator's seat secured to an elevatable platform that is fastened to the vehicle by means of two opposing hydraulic scissor-lifts controlled by the seated operator. It is further desirable to provide an all-terrain vehicle including foldaway stabilizing outriggers to support the vehicle when the seat platform is raised.

SUMMARY OF THE PRESENT INVENTION

The present invention discloses a hydraulic seat lift 20 for an all-terrain vehicle having the driver's seat located on a top portion of a platform and the superior end of the hydraulic scissor-lift mechanism fastened to a side portion of the platform in a manner that would raise the driver seated on the platform as the hydraulic scissor-lift mechanism is extended and would lower the operator as it retracts. The hydraulic scissor-lift mechanism includes two hydraulically powered scissor-lifts located on opposing sides of the seat lift platform with each scissor-lift comprising inversely paired diagonal cross-members that are medially connected to one another with the distal ends of each pair of cross-members pivotably connected to the distal ends of the next pair of cross-members which can be repeated to form a vertically stacked series of interconnected cross-members. Each end of a scissor-lift has the distal end of one cross-member attached to a stationary scissor pin to remain in a fixed position while its opposite cross-member slides within an elongated recess on a scissor roller when an attached hydraulic lift bar is driven by a hydraulic piston to increase or decrease the distance between the two ends thereby extending or retracting the scissor-lift accordingly.

A primary object of the present invention is to provide an all-terrain vehicle having a hydraulic lift mechanism that, when the vehicle is stationary, is able to raise a seated operator above the vehicle to a vertical plane of his choosing.

Another object of the present invention is to provide a hydraulic seat lift for an all-terrain vehicle having the driver's seat located on a top portion of a platform and the superior end of the hydraulic lift mechanism fastened to a side portion of the platform in a manner that would raise the driver seated on the platform as the hydraulic lift mechanism is extended and would lower the operator as it retracts.

Another object of the present invention is to provide a hydraulic seat lift for an all-terrain vehicle wherein the hydraulic lift mechanism includes two hydraulically powered scissor-lifts located on opposing sides of the seat lift platform with each scissor-lift comprising inversely paired diagonal cross-members that are pivotably and medially connected to one another with the distal ends of each pair of cross-members pivotably connected to the distal ends of the next pair of cross-members which can be repeated to form a vertically stacked series of interconnected cross-members.

Another object of the present invention is to provide a hydraulic seat lift for an all-terrain vehicle wherein each end of a scissor-lift has the distal end of one cross-member using a stationary scissor pin to remain in a fixed position while it's inverted cross-member slides within an elongated recess on a scissor roller when an attached hydraulic lift bar is driven by a hydraulic piston to increase or decrease the distance between the two ends thereby extending or retracting the scissor-lift accordingly.

A still further object of the present invention is to provide a hydraulic seat lift for an all-terrain vehicle having a seat with a foldaway backrest that locks into a horizontal position flush to the seat lift platform and out of the drivers way while he is operating the ATV and can be locked into various substantially vertical positions for use as a backrest when desired.

A yet further object of the present invention is to provide a hydraulic seat lift for an all-terrain vehicle having four hydraulic outriggers attached to the sides of the stationary lift frame to support and stabilize the vehicle prior to using the lift mechanism with each outrigger independently adjustable to maintain the seat lift platform and stationary frame in a substantially horizontal position even when parked on uneven terrain.

Another object of the present invention is to provide a hydraulic seat lift for an all-terrain vehicle having four hydraulic outriggers pivotably attached to the sides of the stationary lift frame to allow the retracted feet of the outriggers to swing towards one another to be stowed in a horizontal position alongside the stationary lift frame when operating the ATV and to pivot back down and outward to an angle beyond a perpendicular position relative to the lift frame where they maintained by outrigger stops.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

Figure 1:
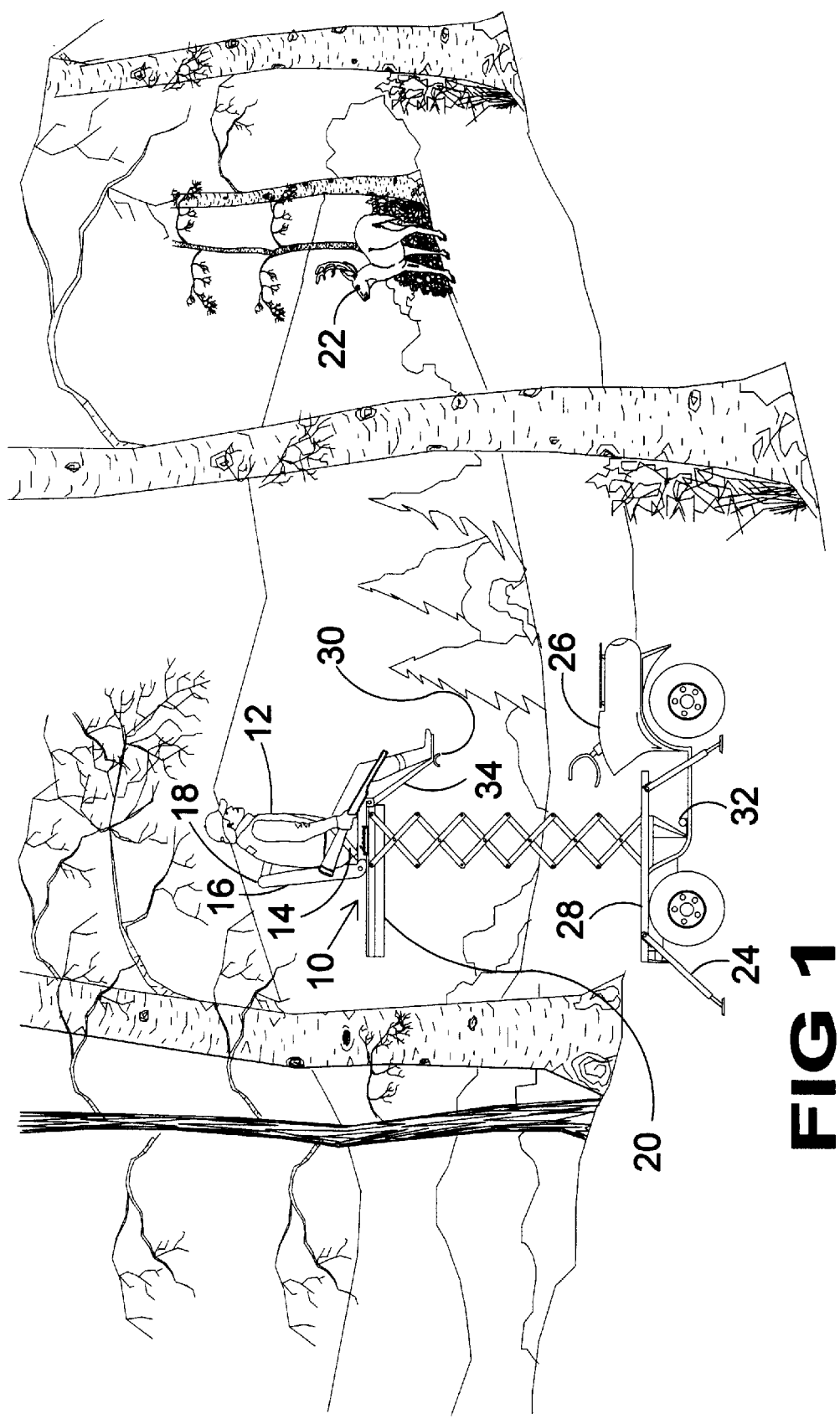
FIG. 1 is side view of the present invention in use; shown is a hunter strapped into the seat with the backrest raised and the seat lift platform elevated to a selected height to give him a better sight line and make his scent more difficult for approaching game to detect. The outriggers are deployed to stabilize the vehicle. The seat lift platform resides within the stationary lift frame when lowered and the slotted footrest lock mates with the foot rest stationary peg to maintain the pivoting footrest beneath the seat to prevent it from obstructing the operation of the ATV.

With regard to reference numerals used, the following numbering is used throughout the drawings.

10 present invention
12 hunter
14 strap
16 seat
18 backrest
20 seat lift platform
22 game
24 outriggers
26 all terrain vehicle
28 stationary lift frame
30 footrest lock
32 footrest peg
34 foot rest leg member
36 hold-down for outrigger
38 outrigger stop
40 hydraulic motor
42 control panel
44 scissor lift
46 cargo rack
48 pivot
50 scissor roller
52 scissor pin
54 foot rest
56 battery
58 voltage regulator
60 hydraulic cylinder
62 lift bar
64 rolling member
66 roller stops
68 channel
72 foot stand
74 screw worm shaft
76 gear box
78 screw nut
80 paired cross members

DESCRIPTION OF THE PREFERRED EMBODIMENT(S)

In order that the invention may be more fully understood, it will now be described, by way of example, with reference to the accompanying drawings in which FIGS. 1 through 14 illustrate the present invention being a hydraulic seat lift for all-terrain vehicles.

Turning to FIG. 1, shown therein is a side view of the present invention 10 in use. Shown is a hunter 12 strapped 14 into the seat 16 with the backrest 18 raised and the hideaway seat lift platform 20 elevated to a selected height to give him a better sight line and make his scent more difficult for approaching game 22 to detect. The multiple outriggers 24 are deployed to stabilize the all terrain vehicle 26. The seat lift platform 20 resides within the stationary lift frame 28 on the ATV 26 when lowered and the slotted footrest lock 30 mates with the foot rest stationary peg 32 on the ATV 26 to maintain the pivoting footrest leg 34 beneath the seat 16 to prevent it from obstructing the operation of the ATV 26.

Figure 2:
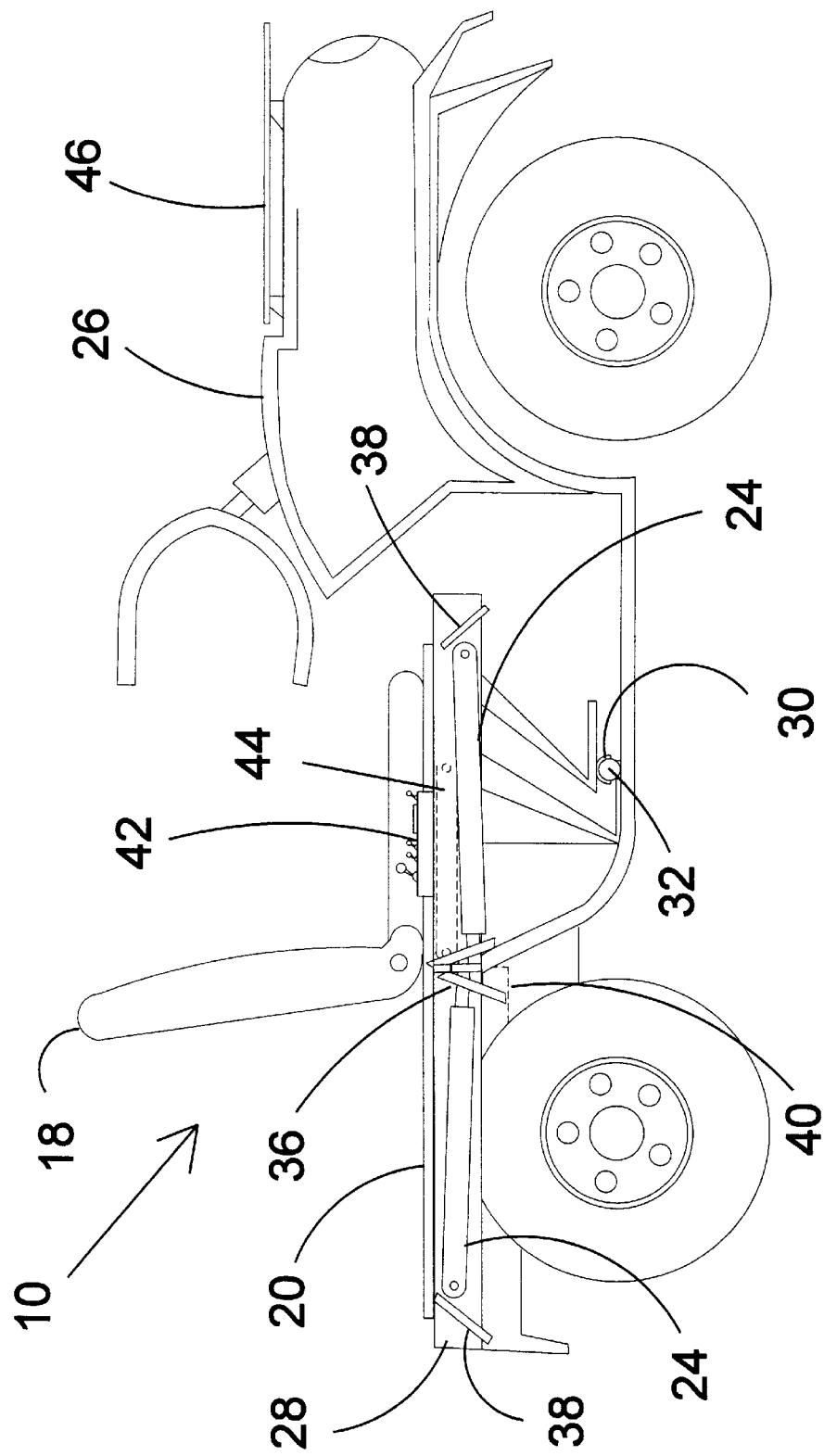
FIG. 2 is a side view of the present invention with the foldaway backrest raised and the outriggers stowed alongside the stationary lift frame and secured by hold-downs. The seat lift platform is nestled within the stationary lift frame and the footrest lock and stationary peg are mated.

Turning to FIG. 2, shown therein is a side view of the present invention 10 with the foldaway backrest 18 raised and the outriggers 24 with stops 38 stowed alongside the stationary lift frame 28 and secured by hold-downs 36. The seat lift platform 20 is nestled within the stationary lift frame 28 and the footrest lock 30 and stationary peg 32 are mated. Also shown are the electric hydraulic motor 40 in the ATV 26 with a control panel 42 mounted on the seat lift platform 20. The scissor lift 44 is also shown internal the stationary lift frame 28 along with a front-mounted cargo rack 46 on the ATV 26.

Figure 3:
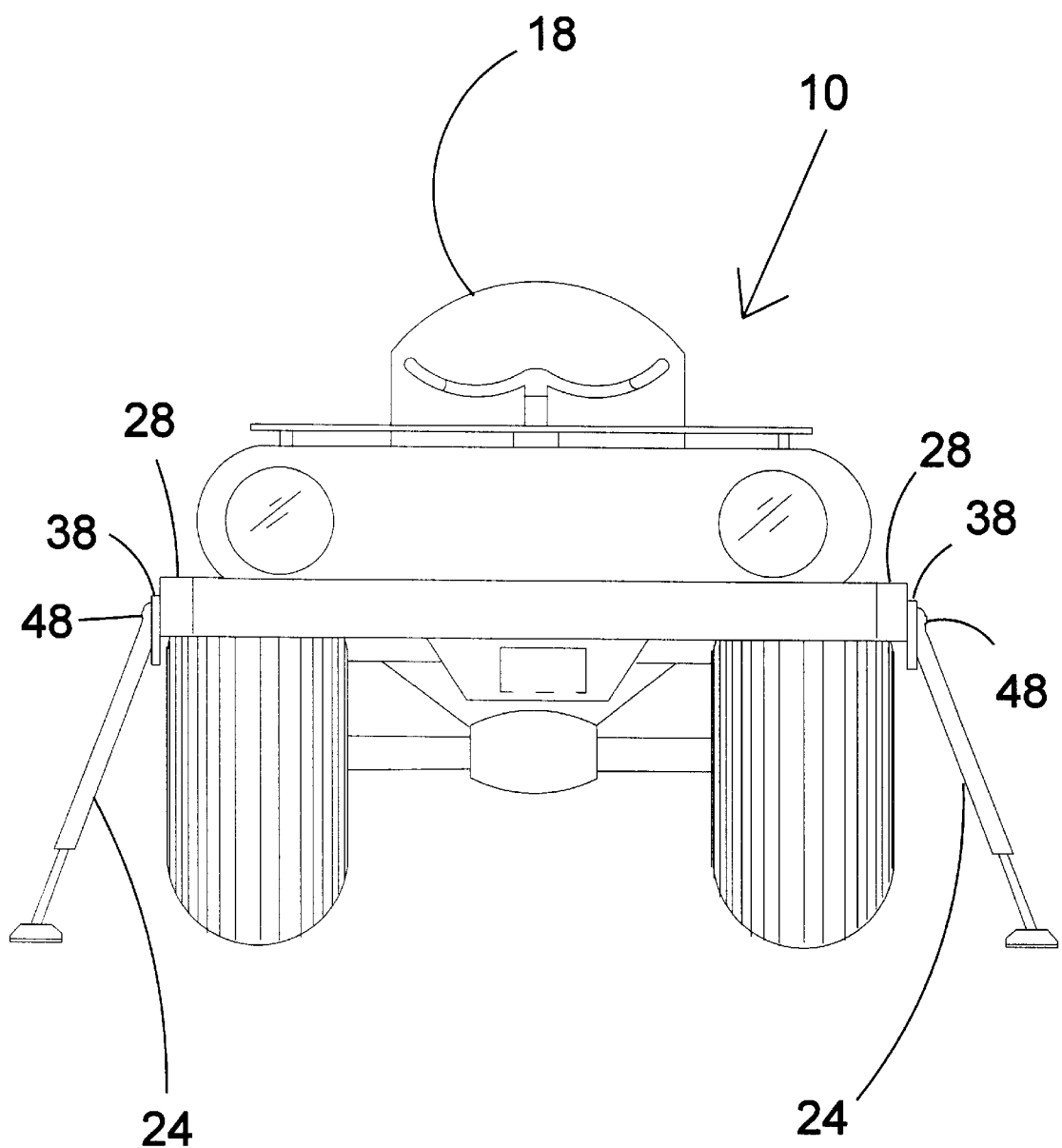
FIG. 3 is a front view of the present invention with the outriggers down and held in place by the stops and the scissor lift in the down position.

Turning to FIG. 3, shown therein is a front view of the present invention 10 with the hydraulic outriggers 24 pivoted 48 down and held in place by the stops 38 and the scissor lift in the down position. The backrest 18 and stationary lift frame 28 are also shown.

Figure 4:
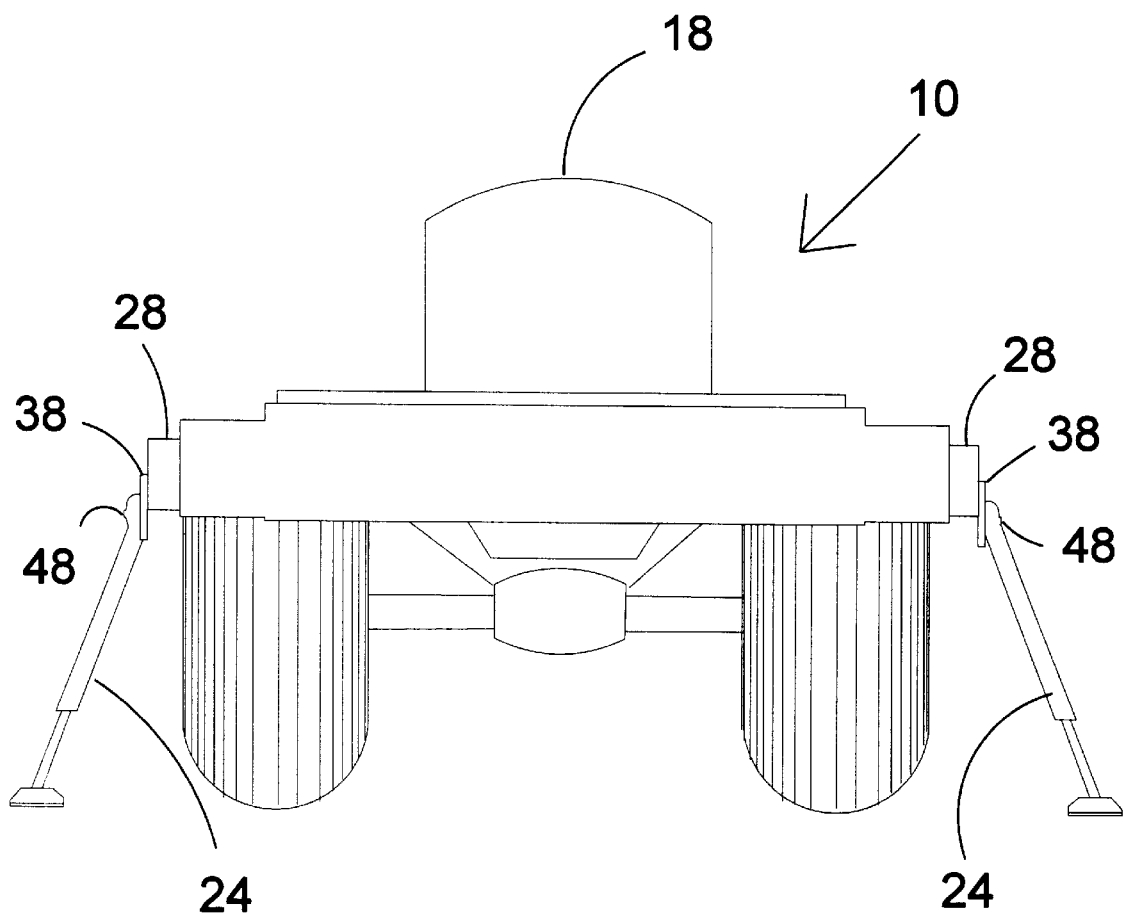
FIG. 4 is a rear view of the present invention with the outriggers down and held in place by the stops and the scissor lift in the down position. The foldaway seat is in the raised position.

Turning to FIG. 4, shown therein is a rear view of the present invention 10 with the outriggers 24 down and held in place by the stops 38 and the scissor lift in the down position. The foldaway seat 18 is in the raised position. Also shown are the stationary lift frame 28 and outrigger pivots 48.

Figure 5:
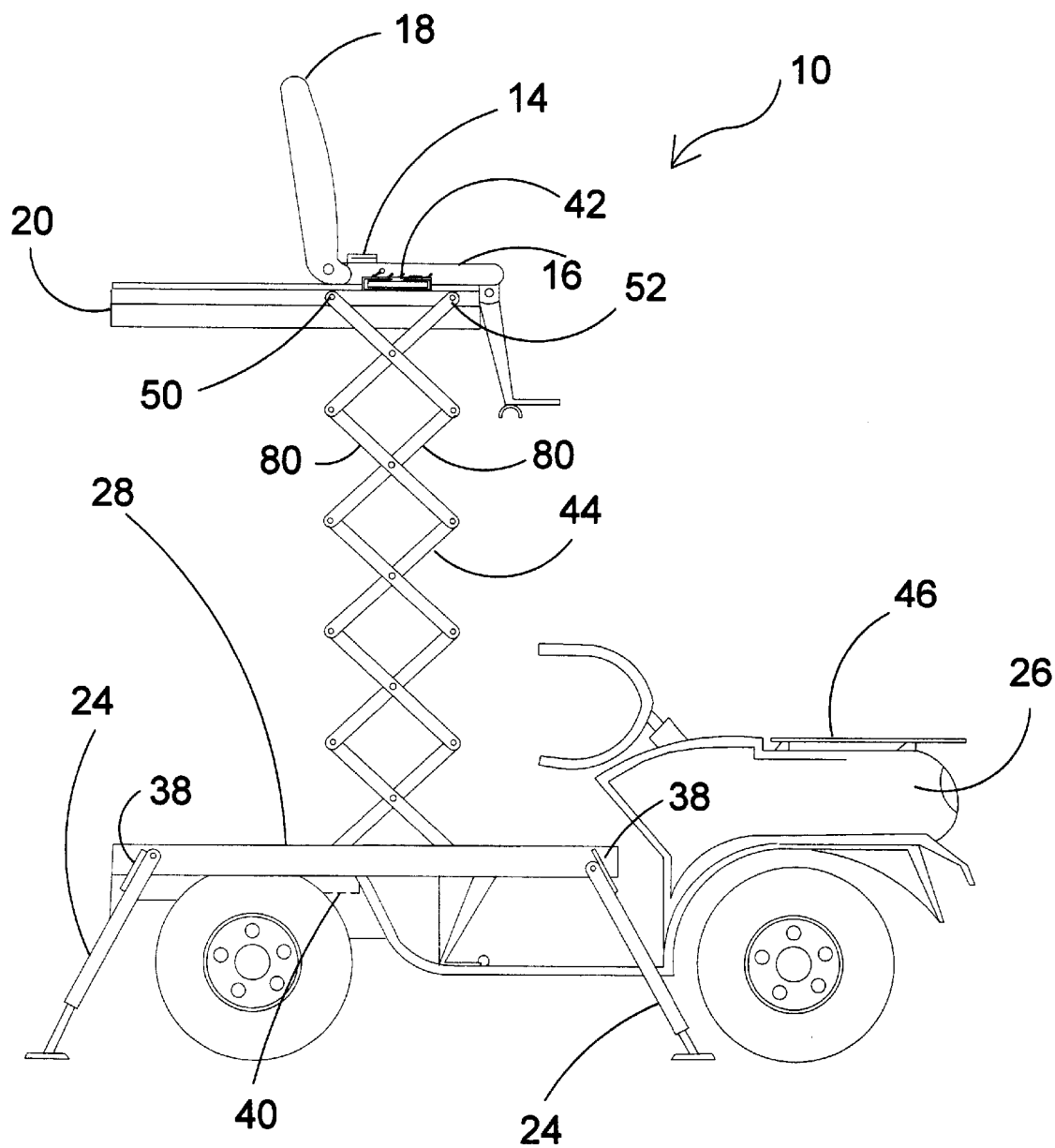
FIG. 5 is a side view of the present invention with the outriggers deployed and the scissor-lift raised.

Turning to FIG. 5, shown therein is a side view of the present invention 10 with the outriggers 24 deployed and the scissor-lift 44 raised. Also shown are the movable scissor roller 50 and stationary scissor pin 52. The present invention 10 discloses a hydraulic seat lift platform 20 for an all-terrain vehicle 26 having the driver's seat 16 located on a top portion of a platform 20 and the upper end of the hydraulic lift mechanism being a scissor-lift 44 fastened to a side portion of the platform 20 in a manner that would raise the driver seated on the seat 16 as the hydraulic lift mechanism 44 is extended and would lower the operator as it retracts. The hydraulic lift mechanism 60 includes two hydraulically powered scissor-lifts 44 located on opposing sides of the seat lift platform 20 with each scissor-lift comprising multiple paired diagonal cross-members 80 that are pivotably connected on their ends and medially connected to one another with the distal ends of each pair of cross-members 80 pivotably connected to the distal ends of the next pair of cross-members which can be repeated to form a vertically stacked series of interconnected cross-members. Each end of a scissor-lift 44 has the distal end of one cross-member fixedly connected by a stationary scissor pin 52 to remain in a fixed position while its opposite cross-member slides within an elongated recess (not shown but see FIG. 10) on a scissor roller 50 when an attached hydraulic lift bar (not shown but see FIG. 9) is driven by a hydraulic piston (not shown but see FIG. 9) to increase or decrease the distance between the two ends 50, 52 thereby extending or retracting the scissor-lift 44 accordingly. The hydraulic piston and hydraulic lift bar are disposed in the stationary lift frame 28 on the ATV 26. Other elements previously disclosed are also shown.

Figure 6:
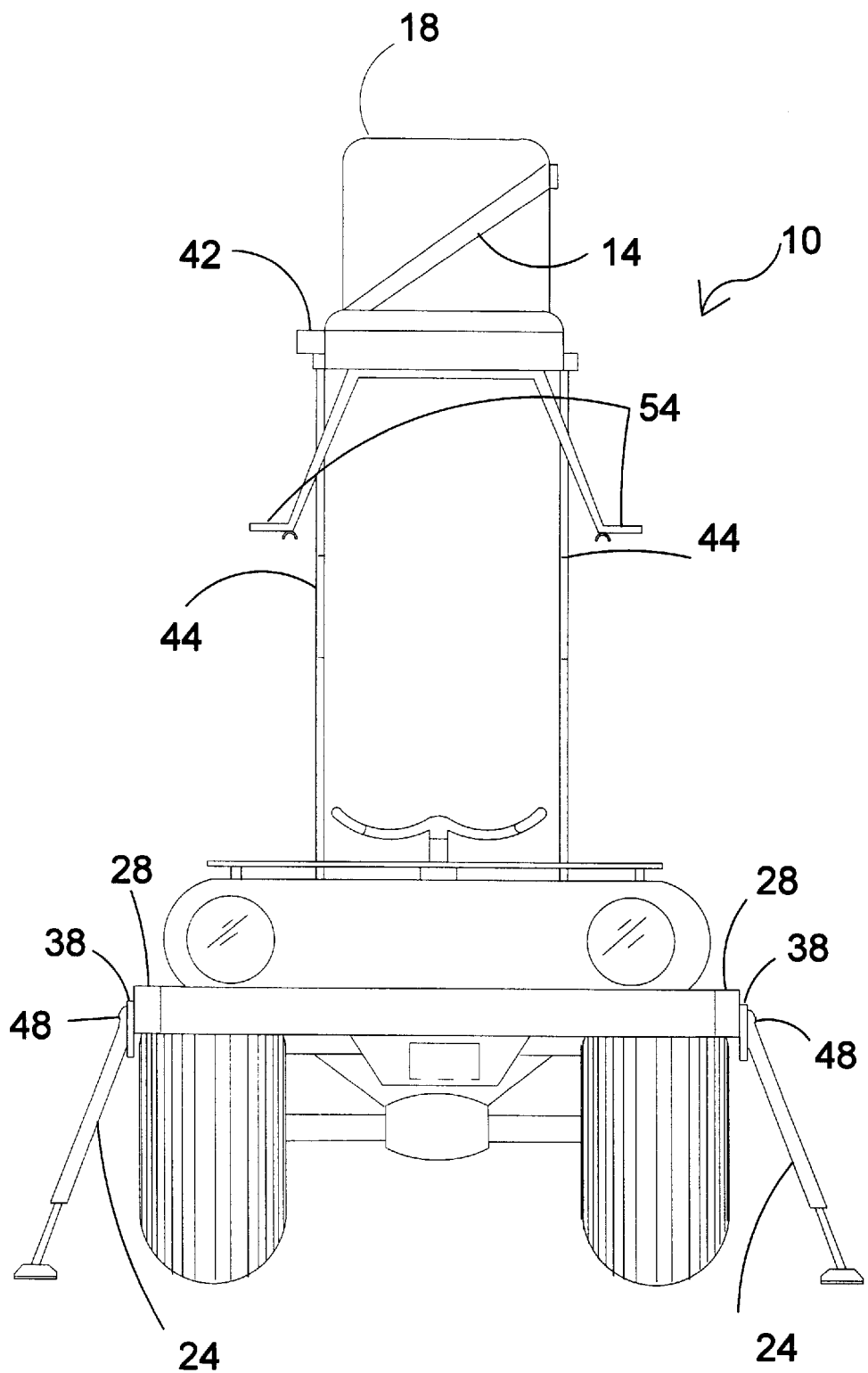
FIG. 6 is a side view of the present invention with the outriggers deployed and the scissor-lift raised.

Turning to FIG. 6, shown therein is a front view of the present invention 10 with the outriggers 24 deployed and the scissor-lift 44 raised. Also shown is foot rest 54. Other elements previously disclosed are also shown.

Figure 7:
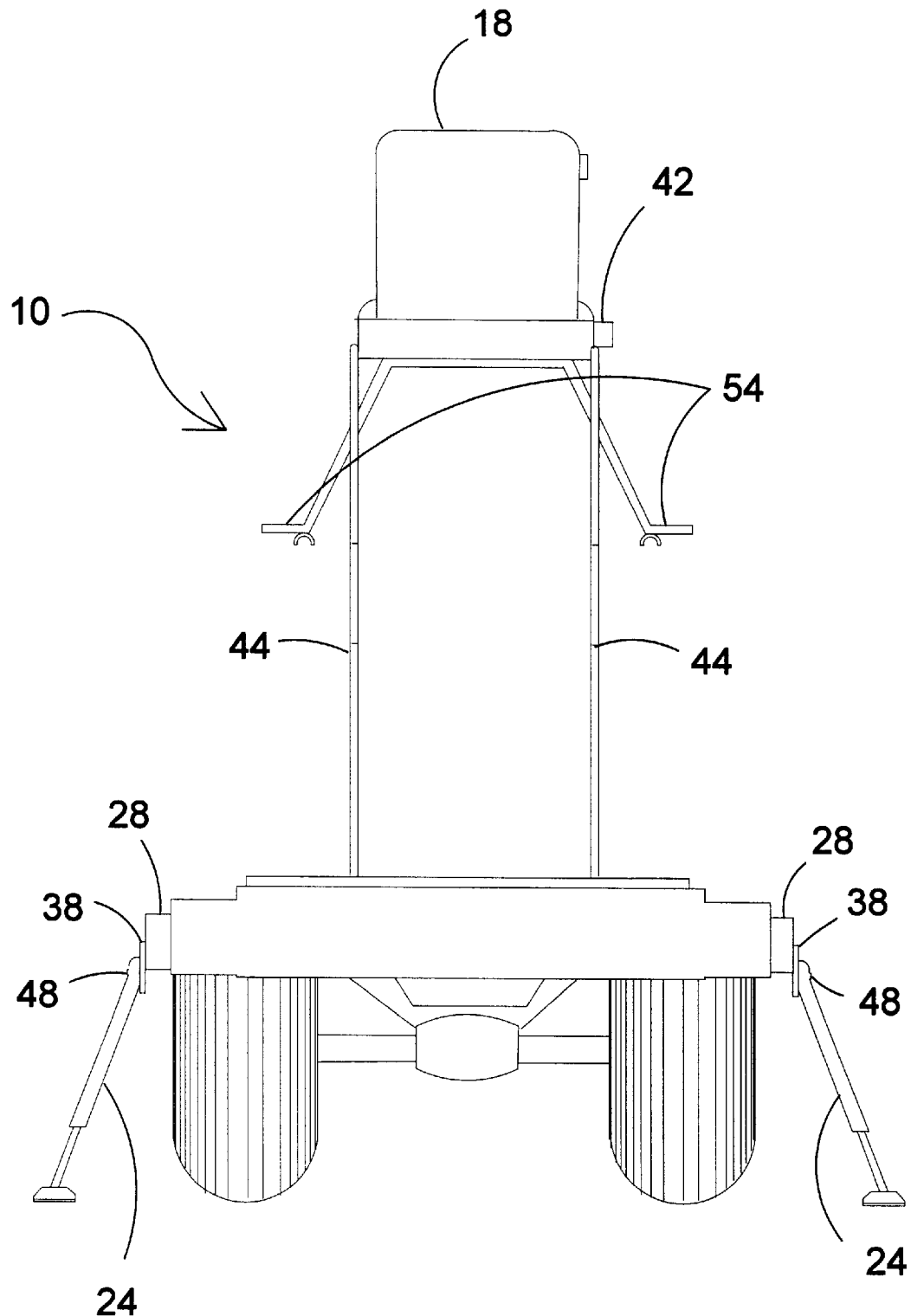
FIG. 7 is a rear view of the present invention with the outriggers deployed and the scissor-lift raised.

Turning to FIG. 7, shown therein is a rear view of the present invention 10 with the outriggers 24 deployed and the scissor-lift 44 raised. Other elements previously disclosed are also shown.

Figure 8:
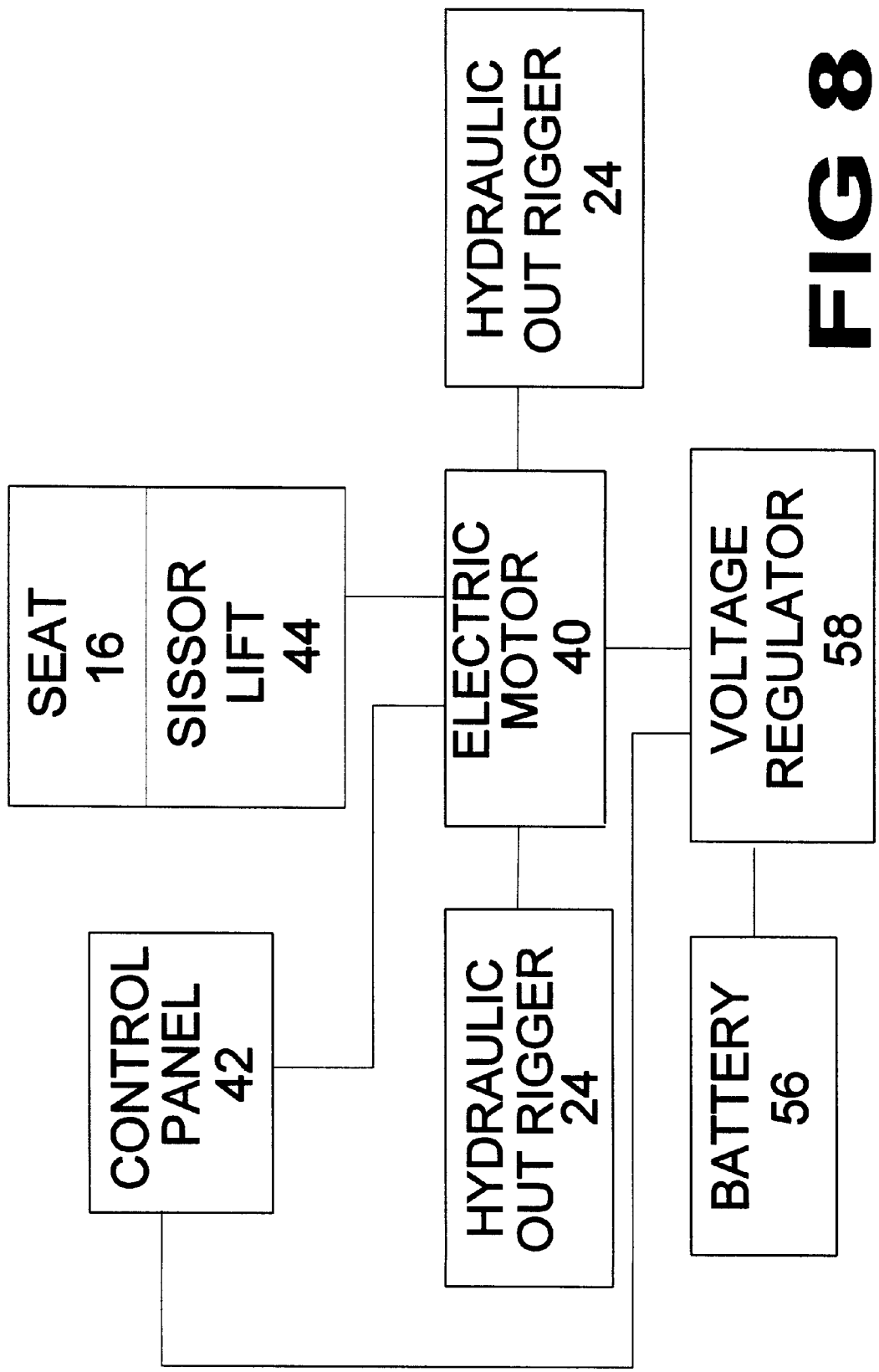
FIG. 8 is block diagram showing the inter-relationship between the various components of the electrical and hydraulic systems.

Turning to FIG. 8, shown therein is block diagram showing the inter-relationship between the various components of the electrical and hydraulic systems as previously disclosed. Also disclosed is a battery 56 and voltage regulator 58.

Figure 9:
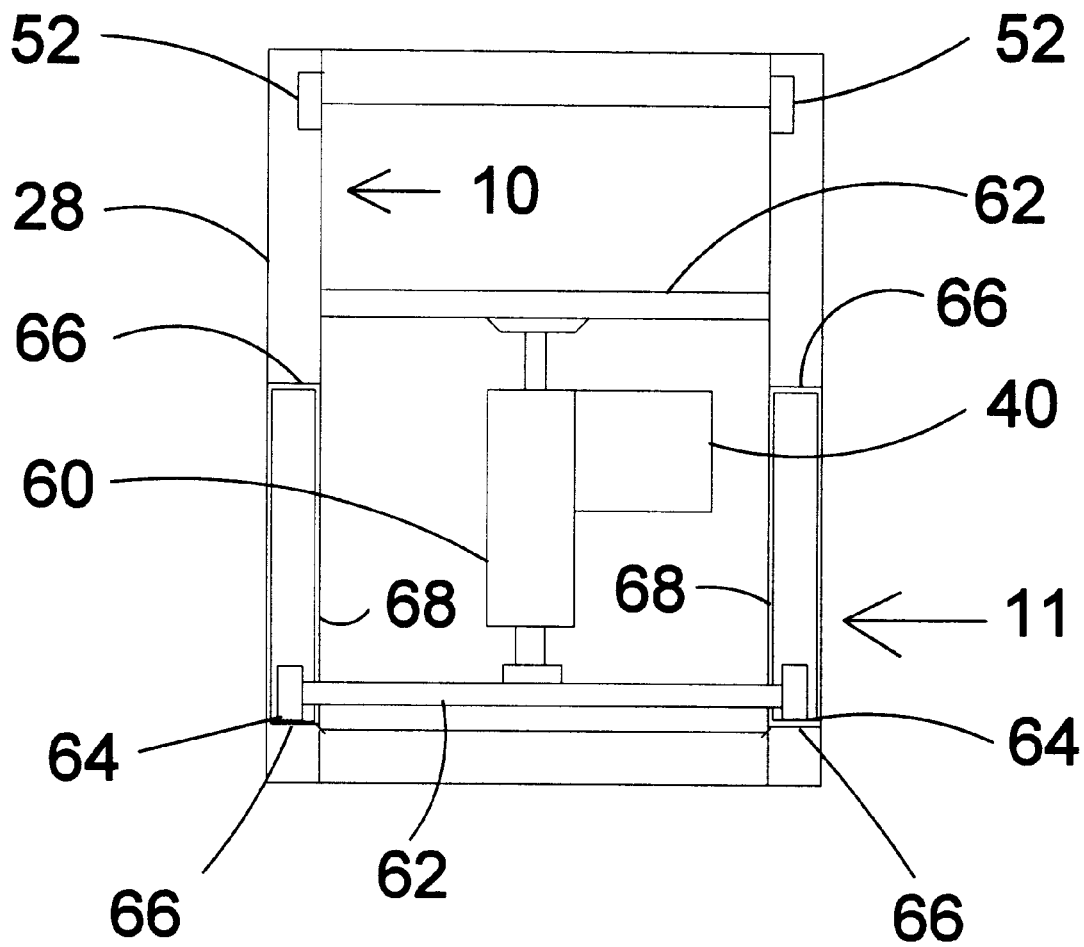
FIG. 9 is a top view of the stationary lift frame; shown is the electrically operated hydraulic piston that moves the hydraulic lift bar connected to the rolling members of the lift assembly thereby expanding or collapsing the scissor lift accordingly.

Turning to FIG. 9, shown therein is a top view of the stationary lift frame 28. Shown is the electrically operated hydraulic piston 60 that reciprocally moves the hydraulic lift bar 62 connected to the rolling members 64 of the lift assembly thereby expanding or collapsing the scissor lift accordingly. Also shown is lift pin 52, roller stops 66 and electric motor 40. Each end of a scissor-lift 44 has the distal end of one cross-member fixedly connected by a stationary scissor pin 52 to remain in a fixed position while its opposite cross-member slides within an elongated recess 68 on a scissor roller 64 when an attached hydraulic lift bar 62 is driven by a hydraulic piston to increase or decrease the distance between the two ends 52, 64 thereby extending or retracting the scissor-lift 44 accordingly.

Figure 10:
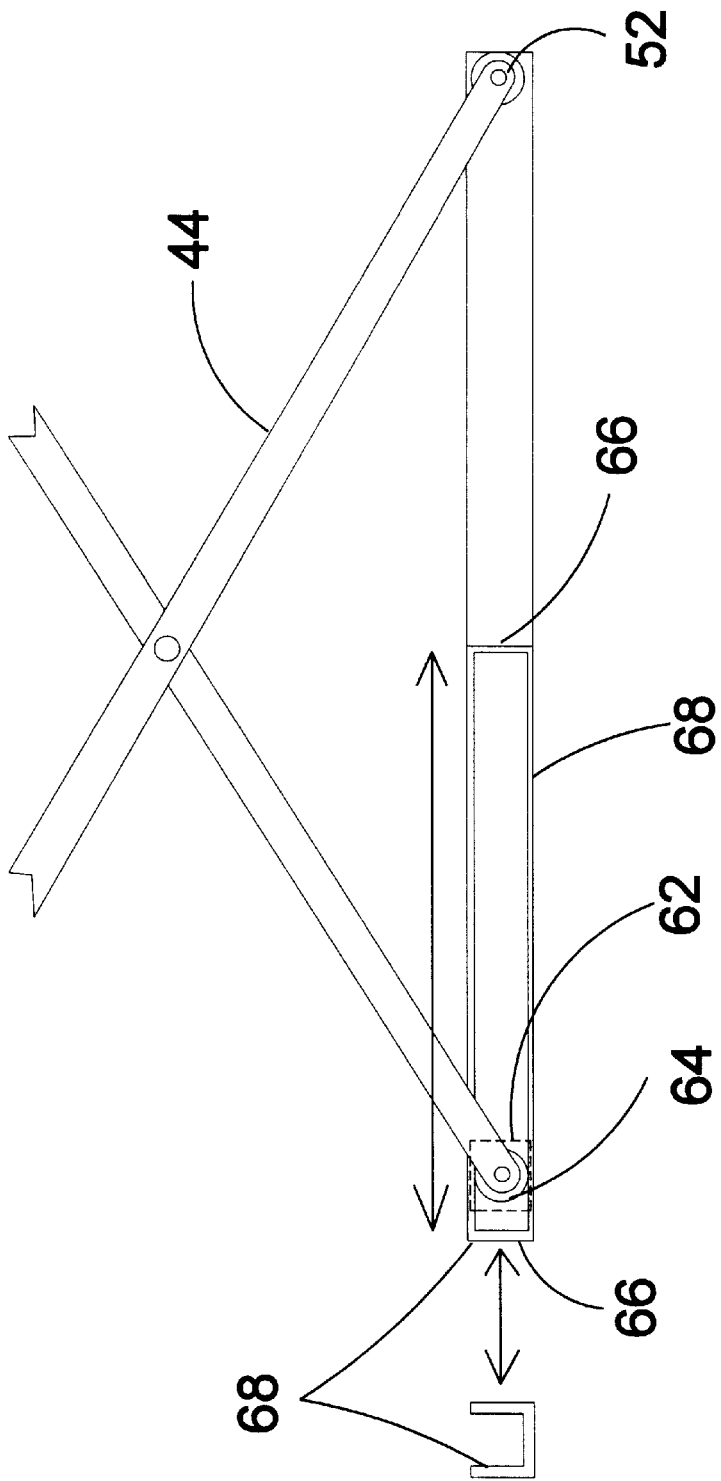
FIG. 10 is a cutaway inside view of the scissor-lift taken from FIG. 9 as indicated: shown is the scissor roller of the rolling member moving within the elongated recess.

Turning to FIG. 10, shown therein is a cutaway inside view of the scissor-lift 44 taken from FIG. 9 as indicated. Shown is the scissor roller 64 of the rolling member moving within the elongated channeled recess 68. Also shown are lift pin 52 and roller stop 66. Movable bar 62 is shown connected to the movable end of the scissor lift. Each end of a scissor-lift 44 has the distal end of one cross-member fixedly connected by a stationary scissor pin 52 to remain in a fixed position while its opposite cross-member slides within an elongated recess 68 on a scissor roller 64 when an attached hydraulic lift bar 62 is driven by a hydraulic piston (not shown but see FIG. 9) to increase or decrease the distance between the two ends 52, 64 thereby extending or retracting the scissor-lift 44 accordingly.

Figure 11:
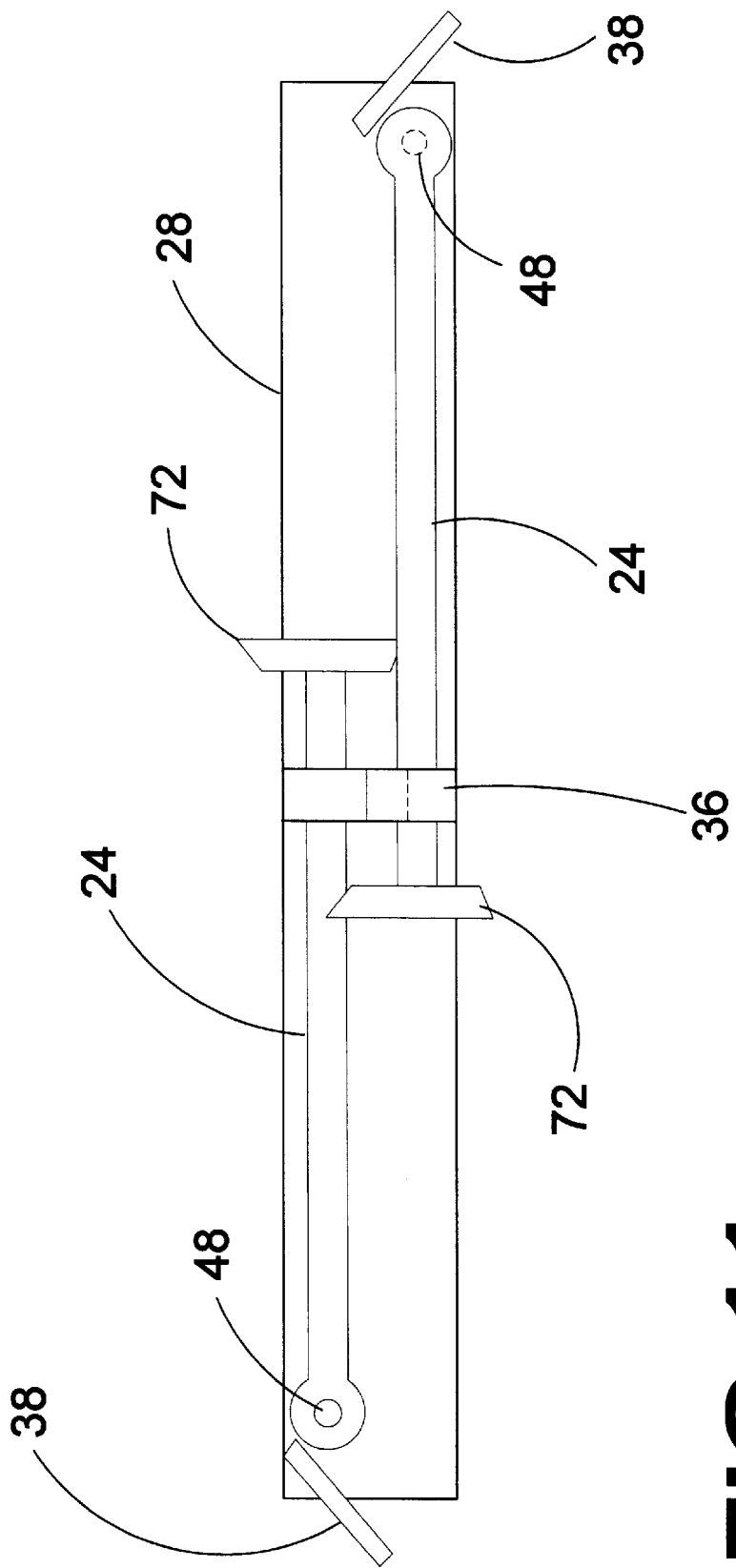
FIG. 11 is a side view of the stationary lift frame taken from FIG. 9 as indicated; shown are the outriggers retracted and up in the stowed position where they are contained by hold-downs. Note the location of the stops that maintain the outriggers when in the deployed position.

Turning to FIG. 11, shown therein is a side view of the stationary lift frame 28 taken from FIG. 9 as indicated. Shown are the outriggers 24 retracted and up in the stowed position where they are contained by hold-downs 36. Note the location of the stops 38 that maintain the outriggers when in the deployed position. Also shown are pivot pin 48 along with the outrigger foot stand 72.

Figure 12:
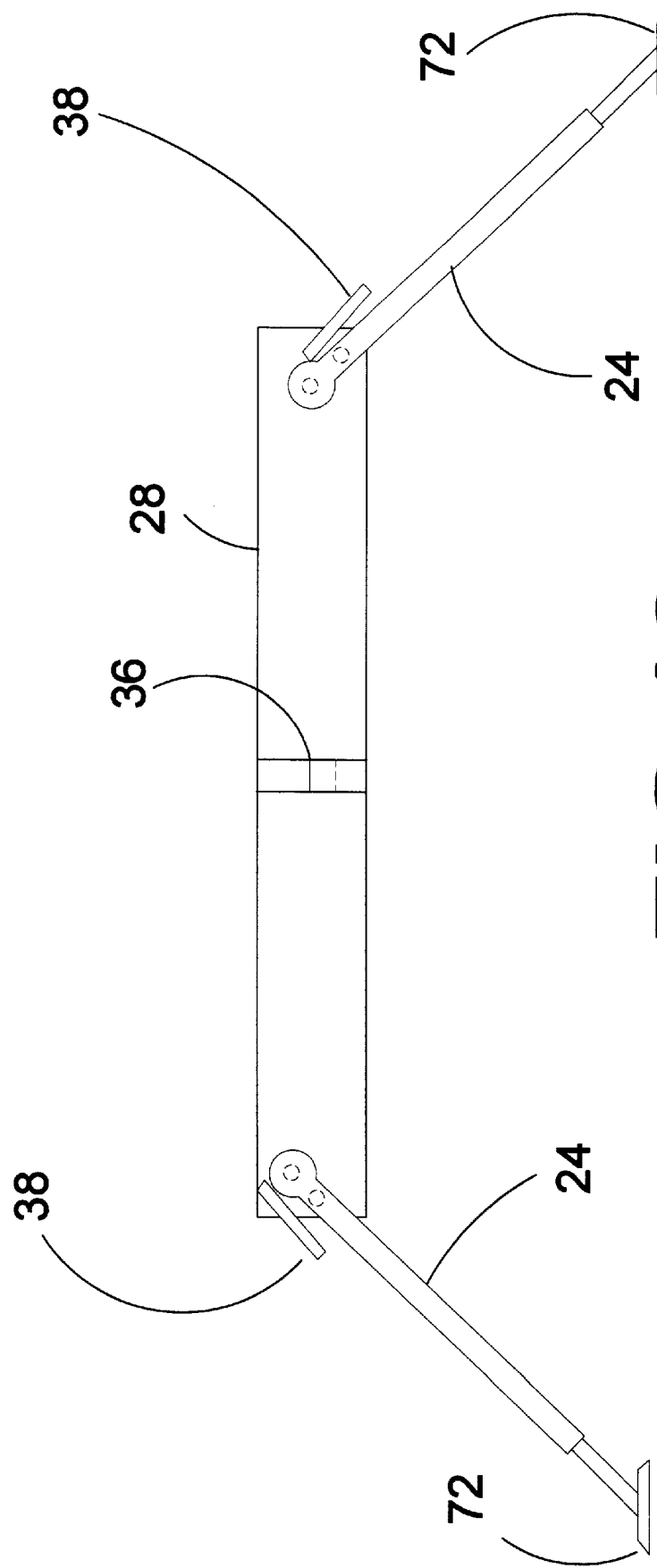
FIG. 12 is a side view of the stationary lift frame showing the outriggers extended and deployed.

Turning to FIG. 12, shown therein is a side view of the stationary lift frame 28 showing the outriggers 24 extended and deployed. Other elements previously disclosed are also shown.

Figure 13:
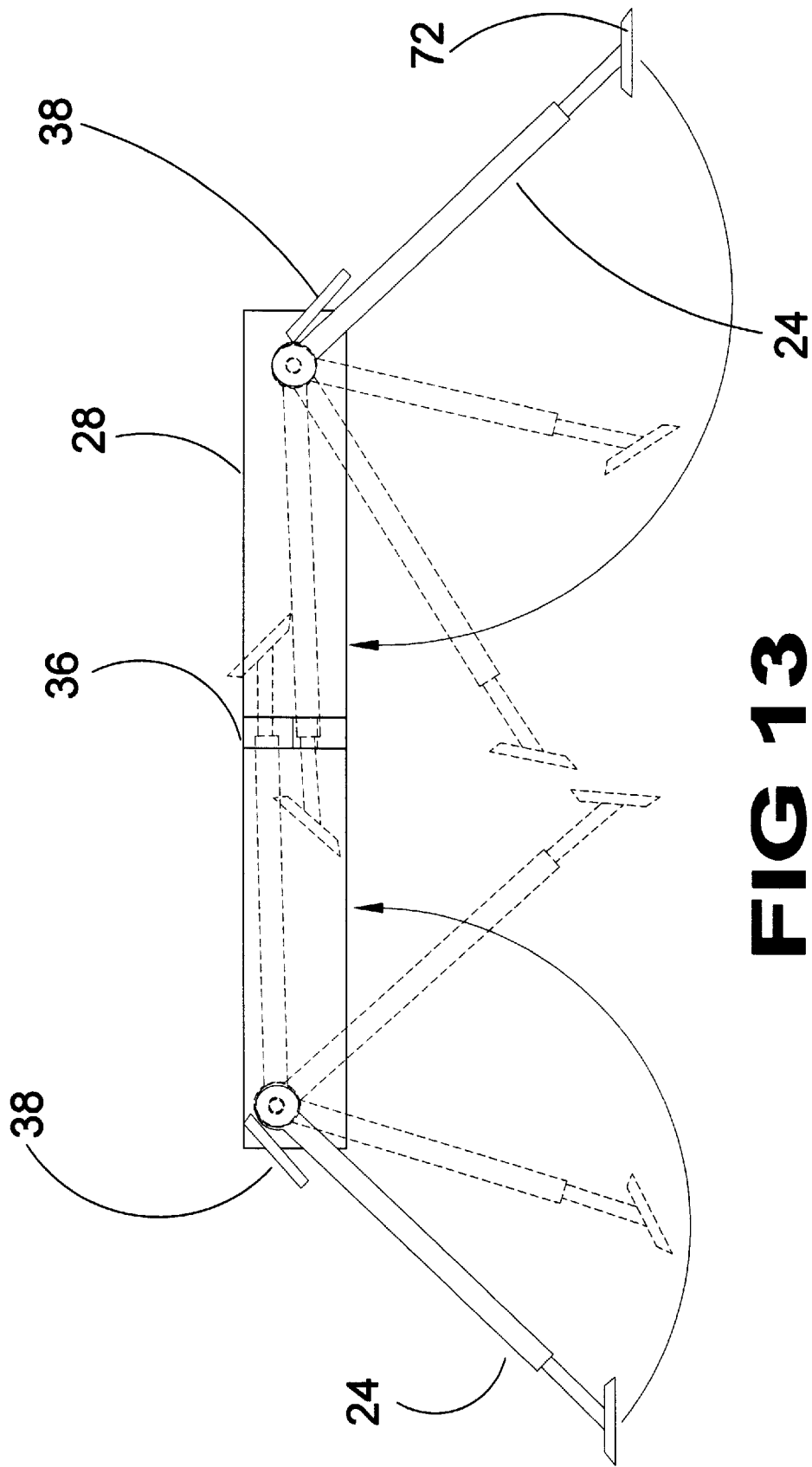
FIG. 13 is a side view of the stationary lift frame showing the outriggers extended and deployed. Shown in hidden line is the movement of the outriggers as they move from the down position to the stowed position.

Turning to FIG. 13, shown therein is a side view of the stationary lift frame 28 showing the outriggers 24 extended and deployed. Shown in hidden line is the movement of the outriggers 24 as they move from the down position to the stowed position. Other elements previously disclosed are also shown.

Figure 14:
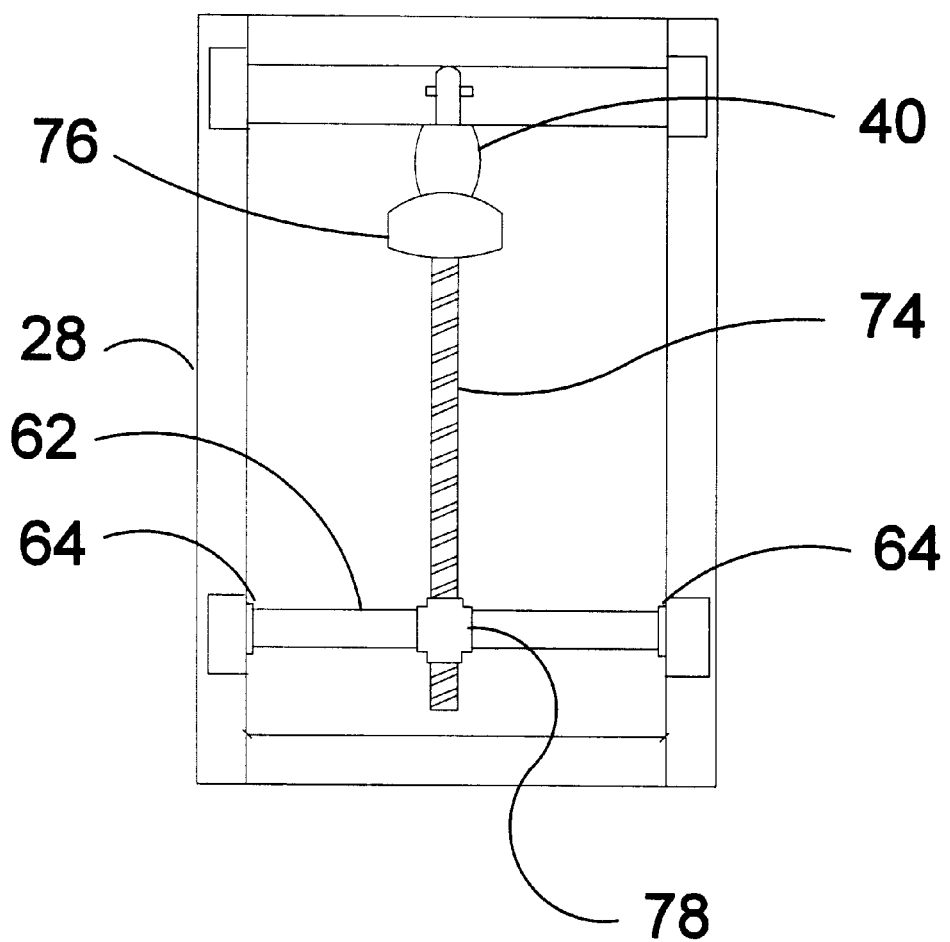
FIG. 14 is an alternate top view of the stationary lift frame showing electrically operated screw worm shaft.

Turning to FIG. 14, shown therein is a top view of an alternative design of the stationary lift frame 28 showing electrically operated screw worm shaft 74 with motor 40, gear box 76 and screw nut 78 attached to and reciprocally moving the lift bar 62 with rollers 64. This design operates similarly to the design disclosed in conjunction with FIG. 9. As the worm screw shaft 74 turns the opposing ends of the scissors are moved either toward or away from each other.

We claim:

1. An apparatus for attachment to an all terrain vehicle for elevating the seat of the operator, comprising:
   a) a seat lift platform for attachment to the all terrain vehicle, whereby the seat of the operator is disposed thereon;
   b) a scissor-lift whereby said seat lift platform is elevated above the all terrain vehicle, said scissor-lift having an upper end and a lower end, said scissor-lift having a plurality of paired cross-members, said cross-members each having a first end and a second end;
   c) a stationary lift frame disposed onto the all terrain vehicle whereby said seat lift platform is attached to the all terrain vehicle;
   d) said upper end of said scissor-lift attached to said seat lift platform;
   e) said lower end of said scissor-lift attached to said stationary lift frame; and,
   f) a reciprocally moving mechanism disposed on said stationary lift frame whereby said scissor-lift is operated, said reciprocally moving mechanism moving said first end and said second ends of said paired cross-members either toward or away from each other.

2. The apparatus of claim 1, wherein said seat lift platform further comprises a generally rectangular lift frame having a top side, wherein the seat of the operator is disposed on said top side.

3. The apparatus of claim 2, wherein said scissor-lift further comprises multiple pairs of opposite scissor-lifts having an upper end of each pair attached to said seat lift platform.

4. The apparatus of claim 3, wherein said scissor-lift further comprises having a lower end of each pair attached to said stationary lift frame.

5. The apparatus of claim 4, wherein said scissor-lift further comprises each pair of opposite scissor-lifts being paired cross-members being pivotally connected intermediately and pivotally connected on each end of each cross-member.

6. The apparatus of claim 5, said lift frame further comprising a pair of generally parallel side members having a first end and a second end, each of said first ends of said side members having a stationary scissor pin therein for attachment to said first end of said paired cross-members of said scissor-lift, further each of said second ends of said side members having a movable scissor roller thereon for attachment to said second end of said paired cross-members of said scissor-lift.

7. The apparatus of claim 2, further comprising a tilt-back seat disposed on the seat of the operator.

8. The apparatus of claim 2, further comprising a control panel for the apparatus disposed on said lift frame adjacent to the seat of the operator.

9. The apparatus of claim 2, further comprising a pair of leg members disposed on the seat of the operator.

10. The apparatus of claim 9, further comprising a foot rest disposed on each of said pair of leg members for receiving the foot of the operator.

11. The apparatus of claim 6, said stationary lift frame further comprising a generally rectangular lift frame, said lift frame further comprising a pair of generally parallel side members having a first end and a second end, each of said first ends of said side members having a stationary scissor pin therein for attachment to said first end of said paired cross-members of said scissor-lift, further each of said second ends of said side members having a movable scissor roller thereon for attachment to said second end of said paired cross-members of said scissor-lift.

12. The apparatus of claim 11, further comprising a movable lift bar fixedly connected to each movable scissor roller, said lift bar fixedly connected to said reciprocally moving mechanism so that said scissor-lift is operated.

13. The apparatus of claim 12, wherein said reciprocally moving mechanism further comprises a hydraulic cylinder, said hydraulic cylinder being operated by an electric motor, said hydraulic cylinder having a first end fixedly connected to said lift frame and a second end fixedly connected to said movable lift bar.

14. The apparatus of claim 13, wherein said reciprocally moving mechanism further comprises a worm gear shaft, said worm gear shaft being operated by an electric motor, said worm gear shaft having a first end fixedly connected to said lift frame and a second end fixedly connected to said movable lift bar.

15. The apparatus of claim 1, further comprising at least four outriggers disposed on each corner of the stationary lift frame, the all terrain vehicle being stabilized thereby.

16. The apparatus of claim 15, wherein said outriggers further comprise a pivot disposed at the point of joinder of said outrigger with said stationary lift frame whereby said outriggers are foldable upon said stationary lift frame.

17. The apparatus of claim 16, wherein said outriggers further comprise a hold down for being secured to said stationary lift frame, and a stop for being secured in position on said stationary lift frame.

18. The apparatus of claim 11, said lift frame further comprising a footrest peg.

19. The apparatus of claim 18, further comprising a pair of leg members disposed on the seat of the operator, further comprising a foot rest disposed on each of said pair of leg members, each of said foot rests further comprising a footrest lock disposed thereon for mating with said footrest peg.

* * * * *